United States Patent [19]

McNemor

[11] Patent Number: 4,772,986

[45] Date of Patent: Sep. 20, 1988

[54] ILLUMINATING DEVICE

[76] Inventor: Glenn A. McNemor, 7433 Masonville Dr., Falls Church, Va. 22042

[21] Appl. No.: 83,976

[22] Filed: Aug. 11, 1987

[51] Int. Cl.$^4$ ............................................. G01D 11/28
[52] U.S. Cl. ...................................... 362/23; 362/28;
362/34; 362/84; 73/431
[58] Field of Search ...................... 362/23, 34, 84, 28;
73/431, 300

[56] References Cited

U.S. PATENT DOCUMENTS

| | | | |
|---|---|---|---|
| 3,610,914 | 10/1971 | Blackwell | 73/431 X |
| 3,699,915 | 10/1972 | Greene | 73/431 X |
| 3,701,900 | 10/1972 | Thuler | 362/84 |
| 3,781,536 | 12/1973 | Naeseth et al. | 362/34 |
| 3,828,611 | 8/1974 | Shamlian et al. | 362/84 |
| 3,861,417 | 1/1975 | Rowe | 73/431 X |
| 4,197,747 | 4/1980 | Koehler | 73/431 |
| 4,405,973 | 9/1983 | Moscarillo | 362/34 |
| 4,581,683 | 8/1986 | Reiter et al. | 362/23 X |

Primary Examiner—Larry Jones
Attorney, Agent, or Firm—Diller, Ramik & Wight

[57] ABSTRACT

An illuminating device to be used in association with an instrument to facilitate reading indicia thereon in low light/dark conditions. The device can be attached to a single instrument or a combination of consolidated instruments gauges. The illuminating device is normally attached to an associated instrument in a generally overlying relationship to the instrument face. The illuminating device can be used with different sources of illumination.

22 Claims, 3 Drawing Sheets

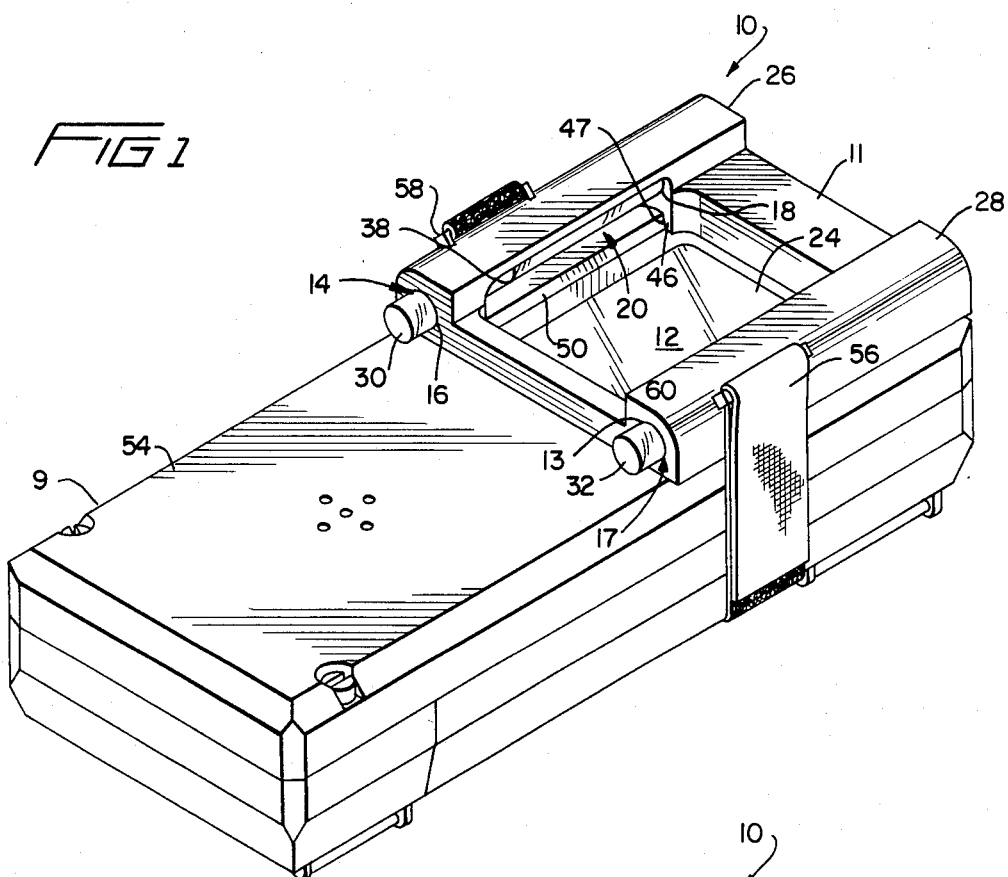

ILLUMINATING DEVICE

THE BACKGROUND OF THE INVENTION

This invention relates generally to devices for illuminating otherwise nonilluminated instruments and gauges, and more particularly to an illuminating device having means for externally illuminating otherwise conventional instruments.

The illumination device herein disclosed is primarily designed for use in association with otherwise conventional scuba diving instruments that may include timers, compasses, depth and pressure gauges, thermometers, digital electronic instrumentation and any combination of these. However, the invention is not to be deemed as being limited soley to the applications just described.

Many compact, hand-held instruments are difficult to read in low light and dark conditions particularity those used in scuba diving. Instruments used in scuba diving give information of paramount importance to the diver. Divers must monitor these instruments many times throughout the course of a dive, in order to keep the dive within its limits. Therefore, a diver should be able to read an instrument with just a glance, but this is not always possible. While diving in low light and dark conditions scuba diving instruments are extremely difficult to read. In fact, many of the advanced digital instrumentation with liquid crystal displays, LCDs, are even difficult to read while using a hand held diver's light. These LCD instruments require a certain lighting angle. Achieving this angle of illumination is usually inconvenient for the diver.

Diving in low light or dark conditions is not uncommon. In fact, diving in the oceans at night is very popular. Night diving gives the diver the opportunity to observe nocturnal creatures of the underwater world. Additionally, divers frequent underwater caves, caverns and ship wrecks all of which provide extremely dark conditions if penetrated or if the dive is made during the night time. While diving in such conditions, divers carry special lights. These lights are designed and adapted for use underwater and they sufficiently illuminate the divers surroundings. Even though it is common practice for a diver to illuminate the instrumentation with this source of external lighting, it is not always effective and convenient.

Scuba divers rely on their instrumentation to monitor the state of the dive. When a diver makes a descent the depth gauge and timer can be used to calculate the rate of descent. The depth gauge will tell the diver when the maximum desired depth has been reached. Once at depth, the diver may require the use of a compass to navigate. The pressure gauge gives the diver an indication of how much available air remains in the scuba tank throughout the course of a dive. The timer is important because time and depth must be interrelated to calculate decompression status. Finally, a diver must ascend from depth and this requires the diver to ascend at a proper rate to avoid possible lung overexpansion injuries. By monitoring the depth gauge and timer (or perhaps one of todays sophisticated dive computers) the rate of ascent can be calculated. The diver typically monitors the instrumentation with a single hand held console which may house all of the instruments. The console is normally attached to the high pressure hose in order to include the pressure gauge which measures air supply pressure. The high pressure hose runs from the scuba tank to the divers console.

Modern technology permits internal lighting to be incorporated with digital electronics. This is exemplified by the lighting features found in digital watches. Internal lighting features in diving instruments would not be desirable. LCDs found on diving instruments are sometimes much larger than the display of a watch; a light source that would illuminate this increased display size would have to be relatively powerful, causing a shortened battery life. Furthermore, many diving instruments contain extreme long life batteries that are permanently sealed into the instrument casing. This is done to maintain the water tight and pressure proof integrity of the instrument and reduce maintenance on seals. Because the additional electrical draw of an internal light would prematurely deplete the actual life of the instrument, internal lighting would be undesirable. Some of the modern digital instruments will allow the user to replace the batteries. This feature is offered in certain instruments because they were intended to be turned on and remain on for extended periods of time. An internal light in this type of instrument would be more possible, because of the increased surplus of electrical power, but still would be undesirable because battery charge intervals would be increased. Every time a battery charge is made a battery compartment must be opened, and before it is reclosed the seals and sealing surfaces must be maintenanced. The increased battery change and maintenance requirements are not desirable. Furthermore, it is well known that if a seal worked for a previous dive the seal will work for the second dive, if the seal has not been tampered.

DESCRIPTION OF THE PRIOR ART

The prior art includes a device called Combo-lites, a trademark of Tekna located at 101 Twin Dolphin Dr., Redwood City, Ca. 94065. This device is a removeable bracket which houses a single miniature chemical light stick. The Combo-Lite is fastened to a Combo-Gauge (Also a trademark of Tekna) between its two primary gauges. When the Combo-Lite is activated light emmitted from the chemical light stick will partially illuminate the depth and pressure gauges of a Combo-Gauge.

A Combo-Gauge is a combination of two or more scuba diving gauges consolidated within a plastic console. The console allows the gauges to be contained within, and arranged in an in-line order. A typical Combo-Gauge may include a compass, depth gauge and a pressure gauge on one side and a timer and knife with sheath on the other. A Combo-Gauge enables a diver to monitor all of these instruments, with a single hand held unit.

There are deficiencies in the design and actual functional abilities of the Combo-Lite. Primarily. the Combo-Lite depends on a single miniature chemical light stick to illuminate the gauges. The limited light supply from a single chemical light stick is insufficient to accomplish this. In addition the Combo-Lite does not have adequate means to effectively reflect and direct light. The high profile of a Combo-Lite is undersirable. The Combo-Lite can be broken off because of a jolt or possibly being hooked on an object. In addition a Combo-Lite can not be readily removed and replaced.

Combo-Gauges have been in existance for sometime before the invention of Combo-Lites. Since the invention of Combo-Lites, Combo-Gauges can be purchased with a Combo-Lite. Old Pre-Combo-Lite Combo- Gauges can be retrofitted to accept the Combo-Lite but this procedure requires the Combo-Gauge to be modified.

SUMMARY OF THE INVENTION

In keeping with the foregoing, the primary object of this invention is to avoid the latter noted deficiencies in prior art devices by providing an illuminating device which is characterized by a frame adapted to hold two chemical light sticks, and position them in such a way to fully illuminate an associated instrument face.

It is an object of this invention to provide an illuminating device which has means to direct light inwardly and downwardly relative to the associated instrument face while confining and reflecting spurious light to the instrument face.

It is another object of this invention to provide an illuminating device that can be readily attached to a conventional instrument and removed without tools or modifications to the instrument.

It is another object of this invention to provide an illuminating device which can be used in association with scuba diving instruments and thereby be resistant to the elements of scuba diving.

It is still another object of this invention to provide an illuminating device which because of its configuration can be adapted to fit a wide variety of instruments without changing the spirit of the embodiment.

It is a further object of this invention to provide an illuminating device that can be in the form of a single unitary molding of relitivly light weight material or machined from the same.

It is still a further object of this invention to provide an illuminating device which has a relitivly light weight and low profile.

Further novel features and other objects and advantages of this invention will become apparent from the following detailed discription, discussion and the claims taken in conjunction with the accompanying drawings.

BRIEF DESCRIPTION OF THE DRAWING

A preferred embodiment of the illumination device of this invention is disclosed in the accompanying drawings in which:

FIG. 1 is a perspective view of the illumination device, and illustrates on illumination device attached to a scuba diving instrument by a strap.

FIG. 2 is a perspective view of the illumination device attached to a holstered scuba diving instrument.

DETAILED DESCRIPTION OF THE PREFERRED EMBODIMENT

Figure 3:
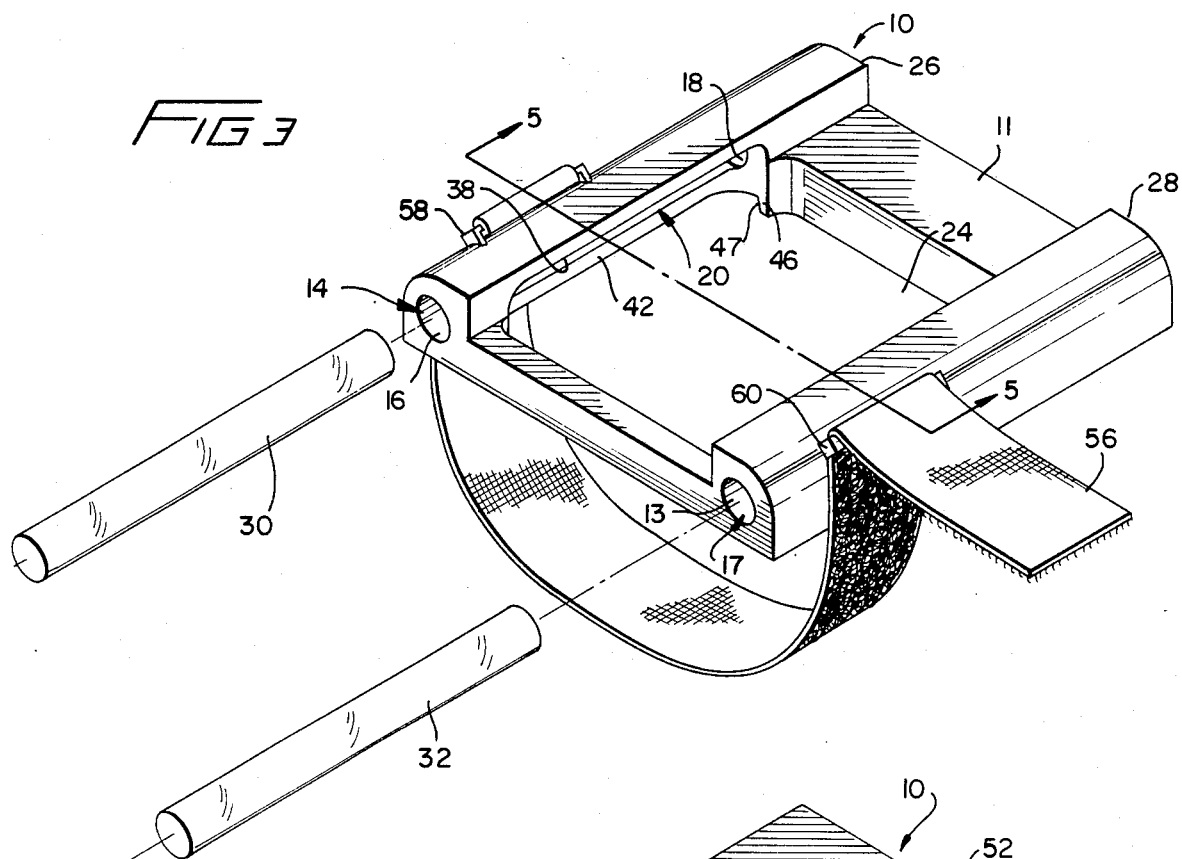
FIG. 3 is an exploded perspective view of the illumination device, the chemical light sticks are removed.

Referring now to the drawings by reference characters, and in particular to FIG. 1, a novel illuminating device 10 is attached to a scuba diving instrument 9. The illuminating device 10 is defined by a frame 11 that may be in the form of a single, unitary injection molding of relatively rigid rubber, plastics, or other material. The material is relatively rigid so the frame 11 will maintain a certain contour and shape that corresponds to an associated recessed instrument face or recessed instrument face area 12. A relatively rigid material is also desirable for maintaining structural integrity that will prevent bores 14, 17 from collapsing therefore deforming illuminescence confining and directing chambers 20, 22. The frame 11 has a through opening 24 of a size and configuration that corresponds to the size and configuration of the associated instrument face 12, and a pair of opposite border portions 26, 28 formed with a bore 14, 17, respectively, which each receive therein a miniature Cyalume chemical light stick 30, 32.

The border portions 26, 28 of the frame 11 form an illuminescence confining and directing chamber 20, 22 which are each defined by a cut away in border portions 26, 28 that spans the length of the through opening 24. The cut away exposes a section of the bores 14, 17 and forms upper edge portions 38, 40 and lower edge portions 42, 44; and thereby defines a pair of bores 16, 18 and 13, 15, respectively, which are separated by a curved chamber surface 34, 36, respectively. The pairs of bores include a set of through bores 13, 16 and a set of blind bores 15, 18.

Figure 5:
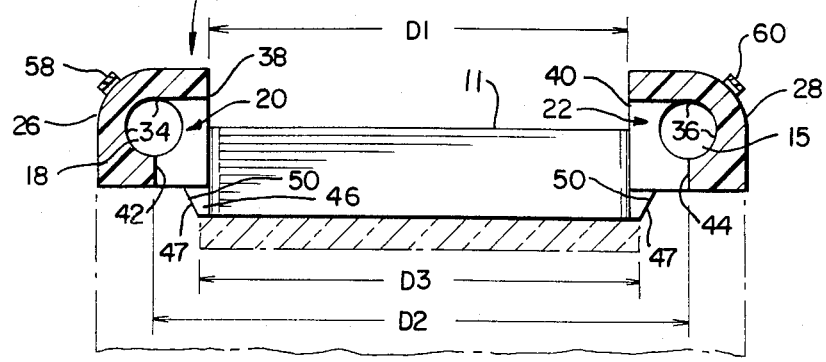
FIG. 5 is a rear cross sectional view of the illumination device taken along the lines 5—5 of FIG. 3, and illustrates the scuba diving instrument in phantom outline.
Figure 6:
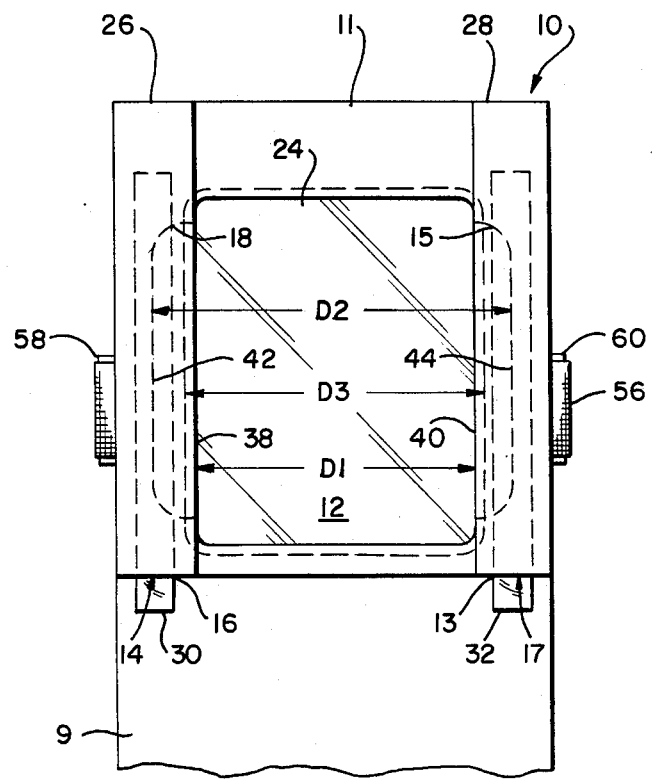
FIG. 6 is a top schematic view with the illumination device in place on a scuba diving instrument.

The curved chamber surfaces 34, 36 extend from the upper edge portions 38, 40 to lower edge portions 42, 44. The upper edge portions 38, 40 are spaced from each other by a distance D1 (FIGS. 5 and 6) that is generally equal to the width D3 of the instrument face 12 (FIGS. 5 & 6) is less than a distance D2 (FIGS. 5 and 6) Between the lower edge portions 42, 44 of the frame 11. With these spatial configurations of the upper edge portions 38, 40 and the lower edge portions 42, 44, the curved chamber surfaces 34, 36 reflect light downwardly relative to the recessed instrument face 12 and maximize direct light as illustrated in FIGS. 1, 2 and 5 by characters LR and LD respectivly. The light so reflected is created by two miniature Cyalume chemical light sticks 30, 32 (See FIG. 3) which are first activated by bending each light stick which permits the two contained chemicals to mix, thereby producing illuminescence for approximately six (6) hours. After the light sticks 30, 32 have been activated, they are inserted into bores 14, 17 (See FIGS. 1 and 2) to provide a source of illumination that once combined with the illuminating device 10 will fully illuminate the associated instrument face 12.

Figure 4:
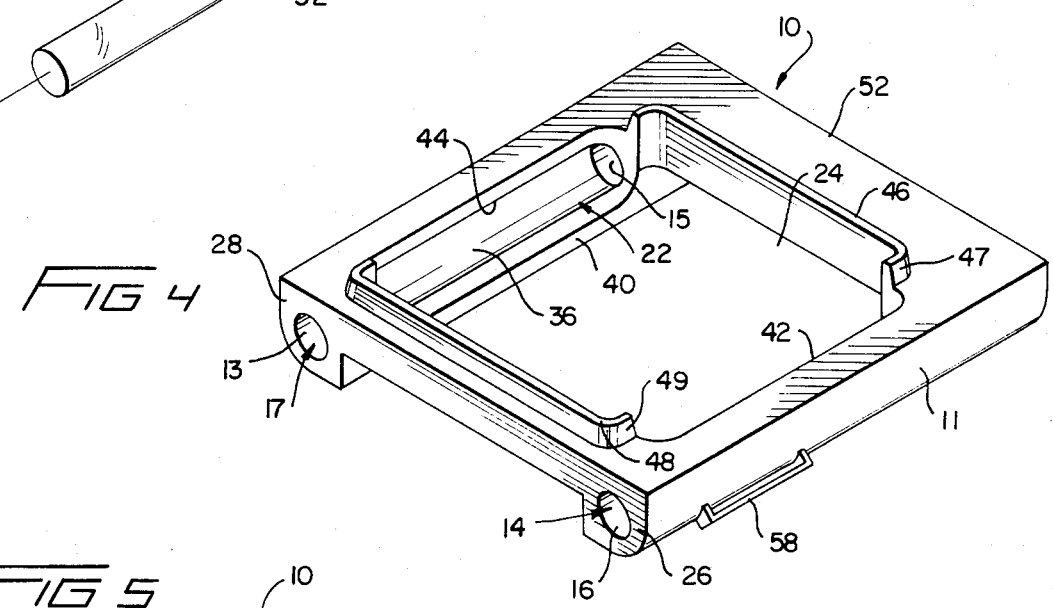
FIG. 4 is a botton perspective view of the illumination device, the strap is removed for clarity.

In addition, the illuminating device 10 utilizes a pair of locating ribs 46, 48 in FIG. 4 as means for locating the through opening 24 in aligned relationship to the associated instrument face 12. The alignment means 46, 48 are a pair of contoured ribs on a bottom surface 52 of the frame 11 which correspond to and fits down inside the recessed instrument face area 12. The association between the locating or alignment ribs 46, 48, including surfaces 47, 49 thereof, and the recessed instrument face area 12 is shown in FIGS. 1 and 2 but is more clearly illustrated in FIG. 5 in which the rib 48 is shown received in and thus located by beveled border surfaces 51, 50. FIG. 5 also illustrates how the illuminating device 10 fits in an overlying relationshipto the associated instrument 9 whereby the bottom surface 52 of the frame 11 fits flat on a top surface 54 of the instrument 9.

In the preferred embodiment of the illuminating device 10 the frame 11 is held in place on the associated instrument 9 with a Velcro strap 56. The characteristics of a Velcro type flexible strap allow it to be easily secured and adjusted. The strap 56 is affixed to the frame 11 by attaching the nappy end of the Velcro strap 56 to a strap loop or guide 58. The remaining end of the strap 56 is free and can freely slip through the remaining loop 24 and be folded over to secure the Velcro closure as shown in FIGS. 1, 2, and 3.

In order to mount and secure the illuminating device 10 to the associated instrument 9 the illuminating device 10 is placed over the instrument face assuring that the alignment means 46, 48 are engaged in the recessed area of the instrument face 12. The strap 30 is then wrapped around the body of the instrument 9 and secured to the strap guide 60, as shown in FIG. 1.

FIG. 2 shows the illuminating device 10 mounted and secured to a scuba diving instrument 9 that was first inserted into a carring holster 62. The holster 62 is adapted to accept the instrument 9, that is it fits snugly around the instrument 9 and it also has a view opening 64 that generally corresponds in size and area to the recessed instrument face area 12. The order of assembly in mounting the illuminating device 10 on the holstered instrument is the same as that described earlier herein except the instrument 9 is first inserted into the holster 62. Since the holster 62 has a certain material thickness, the alignment means 46, 48 will not engage in the recessed area of the instrument face 12, but instead the alignment means 46, 48 will engage in the view opening 64 in the holster 62. Once the alignment means 46, 48 are engaged in the view opening 64 the illuminating device 10 will be in an aligned relationship with the instrument face 12. The illuminating device 10 can now be secured by the Velcro strap 56 as explained earlier, for the application shown in FIG. 1.

The invention may be embodied in other specific forms without departing from the spirit or essential characteristics thereof. The present embodiment is therefore to be considered in all aspects as illustrative and not restrictive, the scope of the invention being indicated by the claims rather than by the forgoing description and all changes which come within the meaning and range of equivalency of the claims are therefore intended to be embraced therein.

I claim:

1. A device for illuminating the face of an instrument to facilitate reading indicia thereon particularly under water comprising a frame, said frame being defined by a peripheral border having an interior peripheral surface setting-off a through opening of a size and configuration of an associated instrument face, means for securing said frame to the exterior of an associated instrument with said opening in generally overlying relationship to an associated instrument face, said frame having upper and lower surfaces bridged by said interior peripheral surface, said border including opposite peripheral border portions, each border portion having an upper edge portion defined by the merging of said upper surface with said interior peripheral surface and a lower edge portion defined by the merging of said lower surface with said interior peripheral surface, said border upper edge portions being spaced from each other a distance less than the distance between said border lower edge portion, at least one of said border portions having a pair of axially spaced generally aligned bores adapted to receive therein illuminescent material, the interior peripheral surface of said one border portions merges with and spans the distance between said aligned bores, and said at least one border portion border lower edge portion is spaced outboard of the radially innermost point of each of said bores thereby defining an illuminescence confining and directing chamber adapted to direct illumination downwardly relative to said upper surface and inwardly relative to said opening.

2. The illuminating device as defined in claim 1 wherein one of said bores is a blind bore and one of said bores is a through bore.

3. The illuminating device as defined in claim 1 wherein another of said border portions has a pair of axially spaced generally aligned bores adapted to receive therein illuminescent material, the interior peripheral surface of said another border portion merges with and spans the distance between said last-mentioned aligned bores, and said another border portion border lower edge portion is spaced outboard of the radially innermost point of each of said last-mentioned bores thereby defining another illuminescence confining and directing chamber adapted to direct illumination downwardly relative to said upper surface and inwardly relative to said opening and said first-mentioned illuminescence confining and directing chambers.

4. The illuminating device as defined in claim 1 including means for locating said frame opening in aligned relationship to an associated instrument face.

5. The illuminating device as defined in claim 1 wherein said securing means includes a flexible strap.

6. The illuminating device as defined in claim 1 wherein said frame lower surface includes means for locating said frame opening in aligned relationship to an associated instrument face.

7. The illuminating device as defined in claim 3 wherein said last-mentioned pair of bores include a blind bore and a through bore.

8. The illuminating device as defined in claim 8 wherein each pair of bores include a blind bore and a through bore.

9. The illuminating device as defined in claim 8 including means for locating said frame opening in aligned relationship to an associated instrument face.

10. The combination of an instrument and an illuminating device therefore comprising an instrument having a face of a predetermined size and shape, said face having indicia thereon adapted to be viewed under low light/dark conditions, said predetermined size including at least one predetermined dimension; a device for illuminating said face and the indicia thereon, said illuminating device including a frame, said frame being defined by a peripheral border having an interior peripheral surface setting-off a through opening of a size and configuration corresponding generally to the size and configuration of said instrument face, means for securing said frame to an exterior of said instrument with said opening in generally overlying relationship to said instrument face, said frame having upper and lower surfaces bridged by said interior peripheral surface, said border including opposite border portions, each border portion having an upper edge portion defined by the merging of said upper surface with said interior peripheral surface and a lower edge portion defined by the merging of said lower surface with said interior peripheral surface, said border upper edge portions being spaced from each other a distance less than the distance between said border lower edge portions, said border lower edge portions being spaced from each other a distance generally corresponding to said face predetermined dimension, at least one of said border portions having a pair of axially spaced generally aligned bores adapted to receive therein illuminescent material, the interior peripheral surface of said one border portion merges with and spans the distance between said aligned bores, and said at least one border portion border lower edge portion is spaced outboard of the radially innermost point of each of said bores thereby defining an illuminescence confining and directing chamber adapted to direct illumination downwardly relative to said upper surface and inwardly relative to said openings toward said face and the indicia thereon.

11. The combination as defined in claim 10 wherein one of said bores is a blind bore and one of said bores is a through bore.

12. The combination as defined in claim 10 wherein another of said border portions has a pair of axially spaced generally aligned bores adapted to receive therein illuminescent material, the interior peripheral surface of said another border portion merges with and spans the distance between said last-mentioned aligned bores, and said another border portion border lower edge portion is spaced outboard of the radially innermost point of each of said last-mentioned bores thereby defining another illuminescence confining and directing chamber adapted to direct illumination downwardly relative to said upper surface and inwardly relative to said opening and said first-mentioned illuminescence confining and directing chambers.

13. The combination as defined in claim 10 including means for locating said frame opening in aligned relationship to said instrument face.

14. The combination as defined in claim 10 wherein said securing means includes a flexible strap.

15. The combination as defined in claim 10 wherein said frame lower surface includes means cooperative with said instrument for locating said frame opening in aligned relationship to said instrument face.

16. The combination as defined in claim 10 wherein said border lower edge portions distance is greater than said face predetermined dimension.

17. The combinations as defined in claim 10 including a housing receiving said instrument, an opening in said housing in generally aligned relationship with said frame opening, and said securing means also secures said frame to said housing.

18. The combination as defined in claim 12 wherein said last-mentioned pair of bores include a blind bore and a through bore.

19. The combination as defined in claim 12 wherein each pair of bores include a blind bore and a through bore.

20. The combination as defined in claim 19 including means for locating said frame opening in aligned relationship to said instrument face.

21. The combination as defined in claim 20 wherein said opening and said instrument face are generally of a polygonal configuration.

22. The combination as defined in claim 20 wherein said instrument face and said opening are generally of a circular configuration.

* * * * *